United States Patent [19]

Faroudja

[11] Patent Number: 4,831,463

[45] Date of Patent: May 16, 1989

[54] VIDEO PROCESSING IN WHICH HIGH FREQUENCY LUMINANCE COMPONENTS ARE FOLDED INTO A MID-BAND SPECTRUM

[76] Inventor: Yves C. Faroudja, 26595 Anacapa Dr., Los Altos, Calif. 94022

[21] Appl. No.: 9,245

[22] Filed: Jan. 30, 1987

[51] Int. Cl.[4] .............................................. H04N 9/79
[52] U.S. Cl. .................................... 358/310; 358/31; 358/330
[58] Field of Search ............... 358/310, 313, 314, 330, 358/11, 13, 31

[56] References Cited

U.S. PATENT DOCUMENTS

| | | | |
|---|---|---|---|
| 1,769,920 | 7/1930 | Gray | 358/15 |
| 3,764,739 | 10/1973 | Faroudja | 358/330 |
| 4,179,705 | 12/1979 | Faroudja | 358/31 |
| 4,227,204 | 10/1980 | Rossi | 358/13 |
| 4,240,105 | 12/1980 | Faroudja | 358/31 |
| 4,323,915 | 4/1982 | Cezar et al. | 358/11 X |

OTHER PUBLICATIONS

Television Engineering Handbook, K. Blair Benson, McGraw-Hill Book Company, p. 1.9 "1.2.3 Luminance".
IEEE Transaction on Consumer Electronics, Nov. 1986, vol. CE-32, No. 4, Development of HDTV Receiving Equipment Based on Band Compression Technique, Nakagawa, Kojima, Noda, Shinkawa, Furuhata.
Reprinted from IEEE Communications Society "IEEE Global Telecommunications Conference", Dec. 2-5, 1985, NTSC Full Compatible Extended Definition TV Proto Model and Motion Adaptive Processing, Fukinuki, Hirano, Yoshigi Fully Compatible EDTV* (edtv: Extended Definition Television)—Central Research Laboratory, Hitachi, Ltd.
Reprinted for Philips Technical Review, vol. 43, No. 8, 1987, HD-MAC: A Step Forward in the Evolution of Television Technology, Annegarn, Arragon, de Haan, van Heuven, Jackson.

*Primary Examiner*—L. T. Hix
*Assistant Examiner*—D. Rutledge
*Attorney, Agent, or Firm*—David B. Harrison

[57] ABSTRACT

Apparatus is disclosed for processing incoming scanning lines of video information having a nominal bandwidth for use with a bandwidth degrading path, such as magnetic tape.

A preprocessor includes a preprocessor comb filter for comb filter processing of the incoming scanning lines to assure the presence of spectral gaps between energy groups in the spectrum of the video information. A fold over circuit folds over high frequency video components of the video information about a predetermined folding frequency to provided folded video. A low pass filter filters the resultant folded video to limit the spectrum thereof to be not greatly in excess of one half of the folding frequency.

A postprocessor includes an unfolding circuit for unfolding the signal from the path about the predetermined folding frequency. A postprocessor comb filter processes the unfolded signal to eliminate unwanted alias components therein resulting during the unfolding process and provides a resultant video signal closely approximating the bandwidth and content of the original video information.

25 Claims, 8 Drawing Sheets

FIG. 3 (RECORD)

"FOLDING OVER" OF LUMINANCE HIGH FREQUENCIES

FIG. 4 (PLAYBACK)

"UNFOLDING" Y
HIGH FREQUENCIES

FIG. 6a (RECORD)

FIG. 6b

FIG. 7a (RECORD)

FIG. 7b (PLAYBACK)

FIG. 9 OPERATION OF SAMPLER IN RECORD MODE

FIG. 9A SAMPLER

FIG. 9B

FIG. 9C FREQUENCY SPECTRUM / TIME DISPLAY

VIDEO PROCESSING IN WHICH HIGH FREQUENCY LUMINANCE COMPONENTS ARE FOLDED INTO A MID-BAND SPECTRUM

FIELD OF THE INVENTION

The present invention relates to television signal processing methods and apparatus. More particularly, the present invention relates to methods and apparatus for folding luminance high frequency components into a mid-band spectrum prior to passage through a bandwidth or resolution degrading medium, and thereafter unfolding and restoring the luminance high frequency components. Comb filter preprocessing and postprocessing techniques are employed in this system.

BACKGROUND OF THE INVENTION

A hitherto unsolved need has appeared in the marketplace for high quality video recording tecniques employing a narrow bandwidth. At the same time, a hitherto unsolved need exists to maintain existing television recorder standards, particularly in the widely proliferated low prime cost home video cassette recorder (VCR) marketplace.

Figure 1:
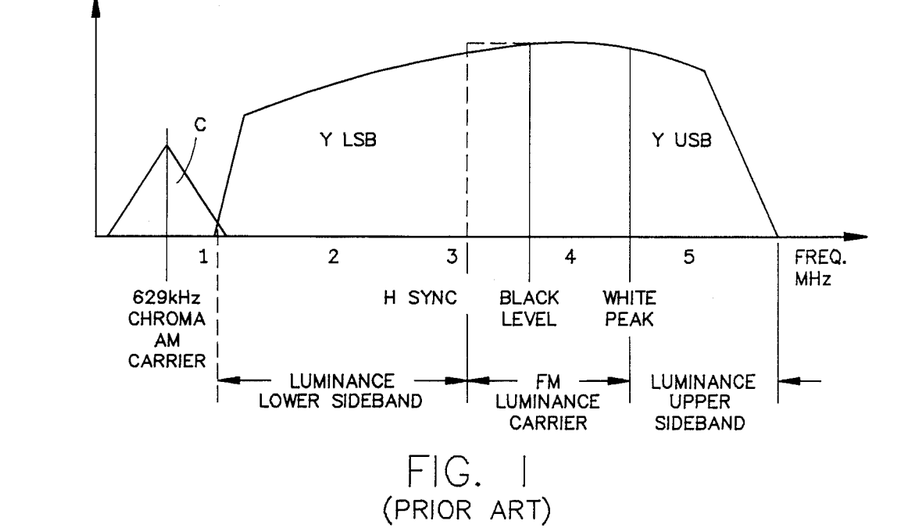
FIG. 1 is a graph of the average energy level in the spectrum of a conventional color video magnetic recording process on a magnetic tape recorded in the VHS format, showing an amplitude modulated color carrier lying below a frequency modulated luminance carrier and upper and lower sidebands.

Low cost VCR's typically employ a color-under spectral format, of the type graphed in FIG. 1, a typical RF energy spectrum for NTSC color subcarrier format television picture information. At the low end of this spectrum, the chrominance information is recorded in quadrature as amplitude modulation carried by e.g. a 629 KHz color carrier. AM color sidebands extend outwardly from the color carrier approximately 500 KHz on both sides thereof.

Luminance information is recorded as frequency modulation at a higher frequency. For example, in the popular VHS home recorder format as illustrated in FIG. 1, the sync tips are at about 3.4 MHz, black level is at about 3.7 MHz, and white level is at about 4.4 MHz. A lower luminance sideband extends downwardly in frequency to about 1.2 MHz and an upper luminance sideband extends to about 5.5 MHz. The upper end tends to be reduced in amplitude in playback, as it is a function of the characteristics of the particular magnetic tape medium, the recording/playback head, and the electronics circuitry of the particular VCR machine and its design.

Tapes and machines vary widely in effective bandwidth, with the result that the poorer quality tapes and machines result in very-low-resolution playback images, while the higher quality tapes and machines employing e.g. comb filter processing techniques in lieu of traps (low pass filters) achieve a somewhat higher resolution. (The present inventor pioneered the use of comb filter techniques for chroma and luminance separation in color video recorders in his earlier U.S. Pat. No. 3,764,739, reference to which is made for further particulars.)

The spectrum available for the lowest sideband which carries luminance information is not wider than about 2.5 MHz for black level information. It may be somewhat higher for white level video information. It is extremely difficult to design a filter that works in the white levels or could vary as a function of the grey scale of the picture energy in the luminance path. No practical low cost implementations have yet been found for such a filter. As a result, the effective bandwidth in playback of a VCR of the VHS type, for example, is limited to about 200 to 250 lines, which results in a noticeably degraded picture, well under broadcast standards for picture quality.

One approach, which is always theoretically available to the VCR designer, is simply to raise the FM carrier frequency used by the recorder in order to take advantage of the latest advances in magnetic media and recording heads. This approach is extremely simple, but requires correspondingly better magnetic tape media. The big drawback to this approach is its limited compatibility with present systems following the same nominal record format, such as VHS. For example, when the carrier frequency is raised by 1.2 megahertz, the old tapes may be made to play back on the new machine, but the conventional machines will be completely unable to play tapes recorded at the higher frequency in the new format. A substantial need, therefore, is that there be compatibility between any enhanced resolution system and presently existing and in place systems and machines.

Prior efforts, such as applicant's prior "Low Level Signal Booster for Television Transition" as illustrated and described in his U.S. Pat. No. 4,262,304, have not been entirely satisfactory, although they have resulted in some apparent improvement in picture resolution in the playback mode.

It has been known for many years that when an object or field of view is periodically scanned in a series of parallel scanning lines and the light level variations are translated into electrical energy analogs, the energy is largely concentrated in a number of discrete energy groups distributed throughout the spectrum used. It is also known that there is very little useful energy lying between the groups, and that the spectral distance between the groups is related to the line scanning rate and the picture frame scanning rate. Most of the energy lies at the line scanning rate and the lower harmonics thereof, and at the frame scan rate and the lower harmonics thereof. In 1930 Gray taught in his U.S. Pat. No. 1,769,920, that the empty spaces between these energy groups were available to be occupied by additional signals, including both picture and sound.

Later, the adoption of the NTSC and PAL color television signal formats brought about the practical interleaving of the quadrature modulated color subcarrier between high frequency components (groups) of the luminance or baseband signal. This interleaving arrangement was realized by selecting as a subcarrier an odd multiple of one half of the line scanning rate, for example. Even with the color subcarrier present, the NTSC spectrum is still characterized by a lot of open space between the luminance energy groups.

Since the phase of the color subcarrier reverses with each successive scanning line and each successive frame, comb filters based on line delays and/or frame delays, and additive recombination circuits for present and delayed signals have been realized for separating chrominance and luminance components from each other.

While comb processing techniques have yielded stationary picture images having superior resolution, adaptivity techniques have been resorted to in order to eliminate the unwanted cross-color and cross-luminance artifacts which have appeared in the combed picture image as a result of the combing operation. Several successful approaches for adaptively controlling comb filter processing in NTSC (and PAL signal formats) are disclosed in the applicant's prior U.S. Pat. Nos. 4,179,705 and 4,240,105.

Another characteristic of the NTSC (and PAL) format is that in many cases excessive information is being transmitted or recorded, and there is no need for it. For example, the luminance high frequencies are being refreshed sixty times per second, when it is recognized that a refresh rate of fifteen times per second is quite satisfactory. Another example of excessive information is that the diagonal resolution of a field of view scanned in the NTSC format is higher by a factor of the square root of two (1.414) than the resolution in either the horizontal or vertical dimension. A moderate loss of diagonal resolution in NTSC is barely perceptible by the eye and is very well tolerated by the viewer.

Recently, substantial picture contrast improvements have been realized in color television picture tubes, and there has been a trend toward more use of projection television systems by the ordinary consumer. The resolution limitations inherent in broadcast quality NTSC color television signals (and PAL format signals), as well) have led to certain proposals for "enhanced resolution" and "high resolution" tevelesion systems that may or may not downwardly compatible with existing NTSC and PAL color schemes.

Several proposals have recently been made for compacting a greater number of spectral energy groups associated with enhanced or high resolution television into a given spectrum or bandwith, so that "high definition" television may be transmitted within the same spectrum presently devoted to standard definition television, such as NTSC, PAL, SECAM and the like.

One proposal is known by the acronym MUSE, for "multiple sub-Nyquist sampling encoding". One report of this technique is found in an article entitled "Development of HDTV Receiving Equipment Based on Band Compression Technique (MUSE)" by Kojima et al., appearing in *IEEE Transactions on Consumer Electronics,* Vol. CE-32, No. 4, November 1986, pp. 759–768. MUSE is a data compression scheme which achieves bandwidth compression by employing a sampling process by which each picture element ("pixel") is sampled once every fourth field (i.e. 1/15th of a second). Thus, four fields are required to reconstruct the entire image. This works perfectly well for stationary images. When motion is present, four times less information is available relating to this motion. However, in the MUSE proposal, a motion vector is developed. The motion is measured and the one in four sampling is carried out as the average rate of the moving object. The premise underlying this sampling approach is that the eyes and brain are relatively less sensitive to moving objects than to stationary objects. Thus, the resolution loss incident to the motion is not as objectionable to the viewer as the same loss would be for a stationary object. MUSE is one serious attempt to achieve bandwidth compression by a process somewhat analogous to spectrum folding.

Researchers led by Dr. Fukinuki at the Central Research Laboratory of Hitachi, Ltd., Tokyo, Japan, have proposed an extended definition television scheme for the NTSC format, which is an attempt to make NTSC look like high definition television. This approach is for transmission paths, such as broadcast signals, and it calls for the high frequency luminance frequencies have e.g. 4.2 MHz to be folded over and placed either under the chrominance sidebands or above the chrominance sidebands, and interleaved with the chrominance sidebands.

The phase of the folded over high frequency luminance remains constant, while the phase of the chrominance sidebands reverses every other frame. Thus, a frame type of comb filter may be employed to separate the chroma from the luminance, and the folded over high frequency luminance may be reinserted at the upper end of the picture spectrum. This approach is reported in a paper by Dr. Fukinuki et al. entitled "NTSC-Full-Compatible Extended-Definition TV-Proto Model and Motion Adaptive Processing", *IEEE Communications Society, Global Telecommunications Conference,* Dec. 2–5, 1985, pp. 4.6.1–4.6.5.

A third high definition television proposal is set forth in an article by M.J.J.C. Annegarn, et al, entitled "HD-MAC: a step forward in the evolution of television technology", *Philips Technical Review,* Vol. 43, No. 8, 1987 (published in 1986), pp. 1–16. In this system each 64 microsecond line period contains in sequence, a first portion for flyback which may contain synchronizing information and sound burst packets, a second portion for color with each line carrying one and the next line carrying the other of the two color difference signals U and V in PAL, (I and Q in NTSC), and a third portion containing compressed luminance wherein the data is acquired by sampling at a sub-Nyquist rate.

While these various proposals have been made for entirely new high definition television systems and formats, none of these approaches have appreciated the need for effective comb filter preprocessing and post-processing of the folded spectra; and, the need dhas remained unsolved heretofore for simple, yet highly effective methods and apparatus for enabling limited bandwidth video records of conventional design to record and reproduce full spectrum luminance signals.

SUMMARY OF THE INVENTION WITH OBJECTS

A general object of the present invention is to improve the performance of a bandwidth-degrading video storage or transmission system by folding high frequency luminance spectral components of video information into lower-band and mid-band luminance spectral gaps formed in a manner which overcomes limitations of the prior art, to process this compressed spectrum video through the storage or transmission path, and then to recover at the playback or receiving end the folded high frequency components by a process generally the inverse of the folding process in order to recover a full bandwidth likeness of the original video information.

Another object of the present invention is to improve the performance of a bandwidth limited video recording system by folding high frequency spectral components of video information into mid-band spectral gaps by virtue of sub-Nyquist sampling and comb filter processing techniques in a manner which overcomes limitations and drawbacks of the prior art.

Another object of the present invention is, when applied to quadrature modulated color subcarrier television systems, such as PAL and NTSC, to make use of a comb filter for simultaneous separation of chrominance and luminance components, and introduction of periodic spectral gaps in the luminance spectrum to provide room for the folding over therein of high frequency luminance components.

A further object of the present invention is to fold over high frequency luminance components into low and mid-band frequency gaps by virtue of sub-Nyquist sampling techniques.

One more object of the present invention is to limit the bandwidth by low pass filtering a mid-band spectrum including folded over high frequency components, thereby obtainig a narrow band signal which has a negligible loss of information as compared to the orginial luminance bandwidth coming in.

A further object of the present invention is to unfold a folded spectrum signal obtained from a limited bandwith medium in a manner silimar to the folding process and which results in a close replica of the original full bandwidth signal.

One more object of the present invention is to contain in a narrow bandwidth signal a full bandwith color television signal.

One further object of the present invention is to provide bandwidth enhancement to a third bandwidth video recording system which remains fully compatible with prexisting record media and apparatus.

A further object of the present invention is to record and play back a full bandwidth television signal, such as an NTSC signal, via a record medium having an effective bandwidth approximating half of the bandwidth required for the full bandwidth signal.

One more object of the present invention is to fold over a luminance spectrum of a line-scan television signal into approximately half of its original bandwidth for limited bandwidth recording and playback in a manner which results in artifacts added by the folding process no more objectional than those already present on account of e.g. the presence of a quadrature modulated color subcarrier.

Another object of the present invention is to provide an improved bandwidth video recording system which is elegantly uncomplicated to practice and inexpensive to implement, with much of the signal processing circuitry available for use in both record mode and playback, so that the invention may be practically implemented within low cost video cassette recording apparatus intended for home or consumer use.

These objects are realized in video recording apparatus for use with a limited bandwidth record medium. The apparatus may provide a video record mode and may also or alternatively provide a video playback mode. In accordance with the invention, the limited bandwidth medium is recorded with aliases of high frequency luminance folded into spectral gaps lying between mid-frequency energy groups of luminance.

In the record mode, the recorder includes a record driver means for recording video information on a record medium, such as one-half inch width tape, as by conventional helical scanning methods. An input processing circuit comprises a comb filter circuit for pre-processing line and frame scan luminance of the video information to establish and promote spectral gaps in a mid-frequency region between energy groups of luminance. A fold over circuit is coupled to the comb filter circuit and operates at a predetermined fixed folding frequency. The folding frequency is selected to be an odd harmonic of one half the line scan frequency of the luminance for folding aliases of high frequency luminance information into the spectral gaps in the mid-frequency luminance. A low pass filter is coupled to the fold over circuit for low pass filtering the luminance through the mid-frequency region thereof, and the low pass filter circuit is connected to drive the record driver for recording on the record medium a bandwidth-limited version of the video information which includes the folded over aliases of original high frequency luminance.

In playback, the recording apparatus (or playback apparatus not including a record capability) includes a playback signal processing circuit for playing back the bandwidth limited version of the original video information recorded on the record medium wherein the aliases of high frequency luminance of the video information have been folded over into the spectral gaps lying between energy groups located in a mid-band region of luminance about the predetermined folding frequency. The apparatus includes an unfolding frequency phase lock circuit for generating an unfolding frequency signal nominally equal to the folding frequency which is phase locked to synchronizing pulses of the video information recovered playback of the record medium. An unfolding circuit is coupled to the phase lock circuit and operates in response to the unfolding frequency signal for generating aliases from the bandwidth limited version of the video information being played back from the record medium including an alias of the high frequency luminance originally folded into the spectral gaps, and other aliases, to provided an unfolded signal. A comb filter circuit, preferably substantially identical in characteristics to the comb filter circuit in record mode, is connected to the unfolding circuit and comb filter processes the unfolded signal in order to phase cancel all of the other aliases and put out a raeproduction of said video information including the high frequency luminance.

These objects, advantages and features will be more fully understood and appreciated by considering the following detailed description of preferred embodiments, presented in conjunction with the accompanying drawings.

BRIEF DESCRIPTION OF THE DRAWINGS In the Drawings:

FIG. 3A–3D illustrates in progressive graphs a method of the present invention for folding over aliases of luminance high frequencies into mid-frequency spectral gaps in a record mode.

FIGS. 4A-4C illustrates in progressive graphs a method of the present invention for unfolding aliases of luminance high frequencies in the mid-frequency spectral gaps of the record medium into a likeness of the original video having full bandwidth.

DETAILED DESCRIPTION OF PREFERRED EMBODIMENTS

Figure 6A:
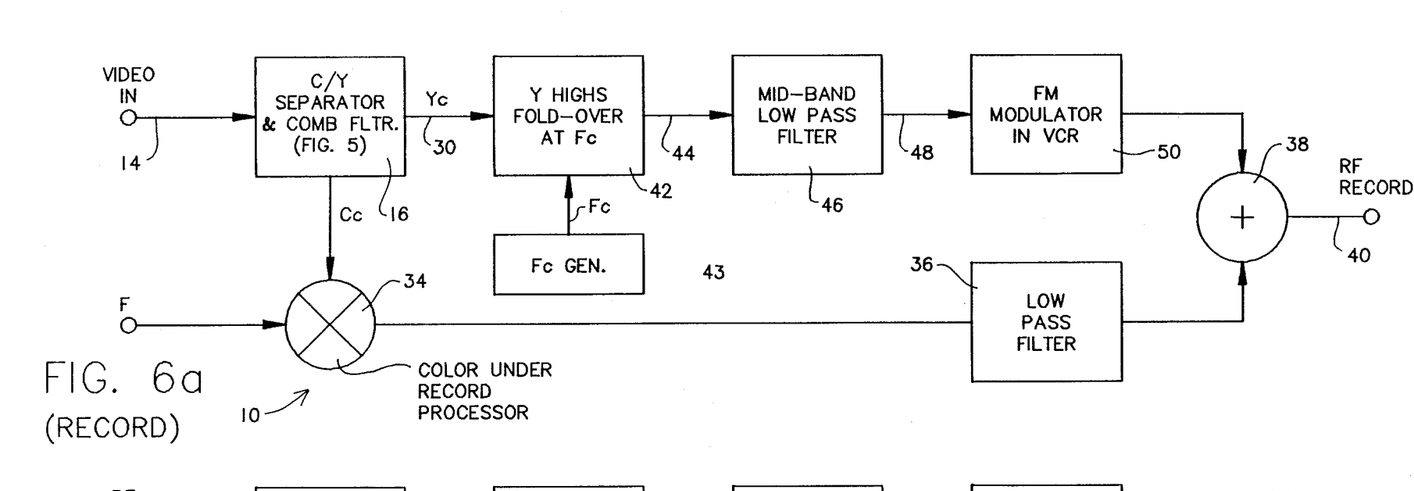
FIG. 6A illustrates one preferred embodiment of limited bandwidth video recording apparatus operating in the record mode in accordance with principles of the present invention.
Figure 6B:
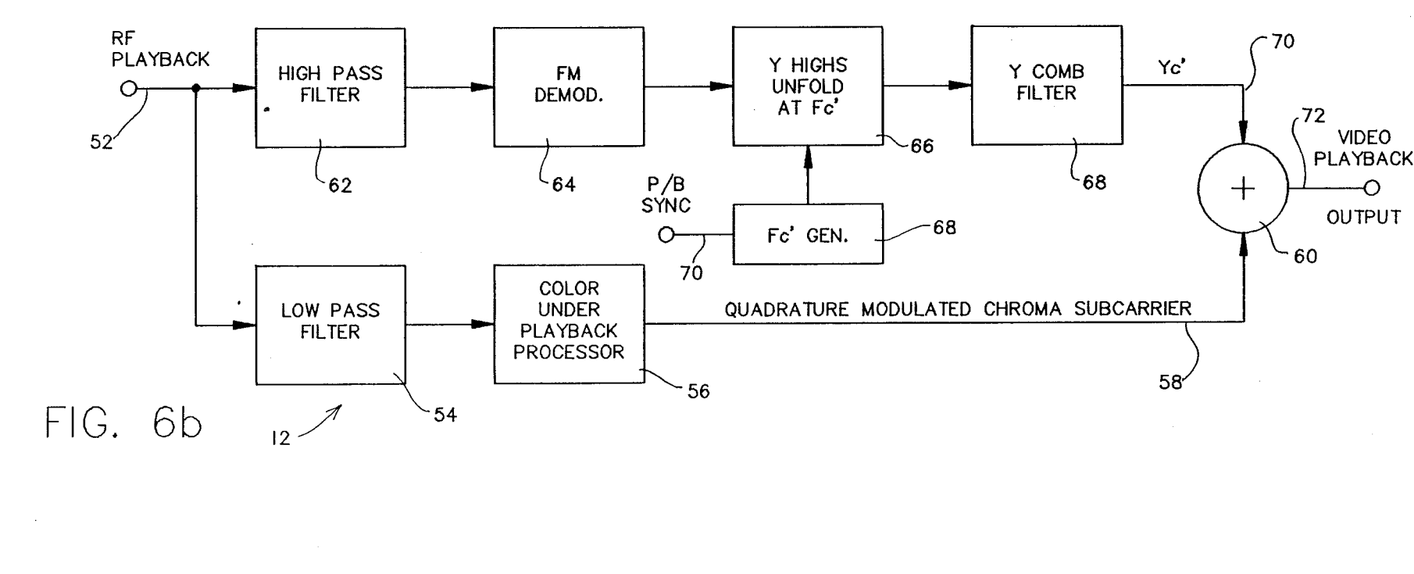
FIG. 6B illustrates one preferred embodiment of limited bandwidth video playback apparatus operating in the playback mode in accordance with principles of the present invention.

A first preferred embodiment of the present invention is depicted in FIGS. 6A and 6B. Therein, a record processor circuit 10 is illustrated for the record mode in FIG. 6A, and a playback processor circuit 12 is illustrated for the playback mode in FIG. 6B. While it will be appreciated by those skilled in the art that the record circuit 10 may be separate from the playback circuit 12, in most practical embodiments, the circuits 10 and 12 are included within the video cassette recorder, and they are not physically separate and distinct, as they preferably make use of the same buildng blocks alternately switched between record and playback configuration, to minimize circuit implementation costs.

One point for separating the circuits is that the recording may be performed on one machine, such as a high speed, very high quality duplicator used to generate movie rental cassettes; and, playback may be performed on a home or consumer quality video cassette recorder.

The recorder processor 10 includes an input 14 which receives either composite video or luminance. In some situations, luminance is separated from, or not yet combined into, composite color video, such as a signal from a portable camera (not shown) which is adapted for direct plug-in and use with the recorder. In other cases, the recording system may be monochrome, with only a luminance channel present. As used herein, the term "luminance" is a psychophysical analog of brightness, measured in terms of luminous flux per unit projected area of the illuminating source, such as the television screen for example.

The signal present at the input 14 is first delivered to a comb filter 16 which in the case of composite color video separates by combing action the chrominance component Cc from the composite video signal and separates the luminance component Yc from the composite video signal. (The subscript "c" associated with the labels "Y" and "C" in FIG. 6A denote that these components have been separated from the composite by comb filter processing.)

There are two forms of comb filtering processes: "chroma-style" comb filtering (hereinafter referred to by the index "Cc") which favors odd-multiples of one half of the line and/or frame frequencies, and "luminance's tyle" comb filtering (hereinafter referred to by the index "Yc") which favors evenmultiples of one half of the line and/or frame frequencies and eliminates the odd-multiples of those frequencies.

Precombing of the luminance component of the composite video signal has been found to be necessary, since the spectral gaps in the mid-frequency luminance spectrum are not always unoccupied by informational energy, particularly under picture conditions of diagonal transitions and/or motion.

Figure 5A:
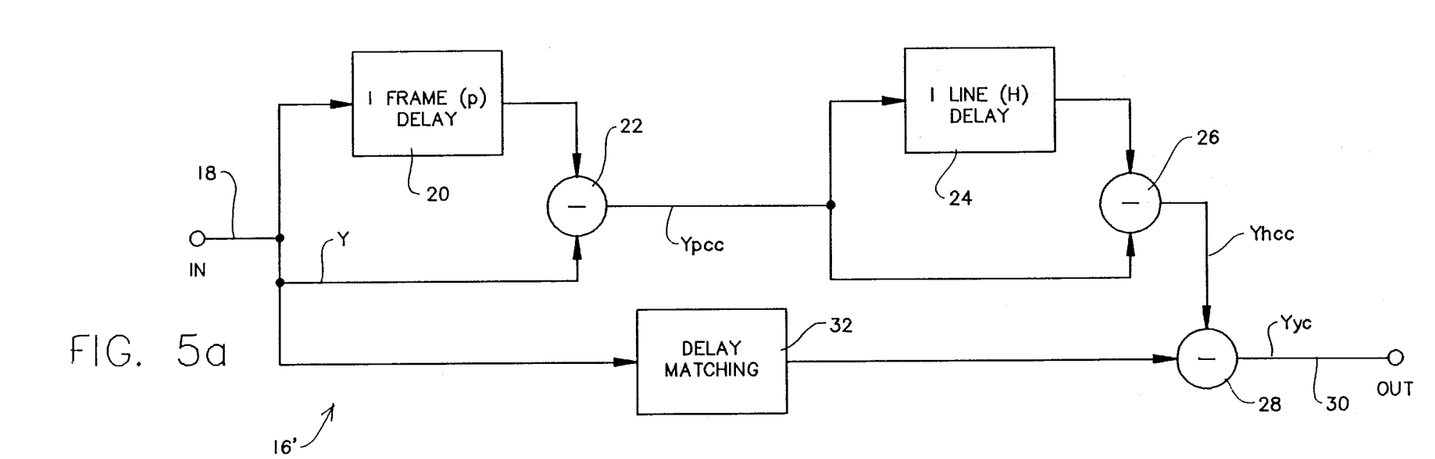
FIG. 5A illustrates a simplified bi-dimensional comb filter structure which provides one frame and one line comb filter processing suitable for use within apparatus of the present invention.

One low cost embodiment 16' of the comb filter 16 is depicted in FIG. 5A. Therein, the comb 16' includes an input 18, a one frame delay circuit 20, preferably implemented as a low cost digital frame store including analog to digital conversion at its input. Such frame delays 20 are increasingly encountered in low cost VCRs of the type whose performance is enhanced by the present invention. A difference circuit 22 subtracts the incoming signal at the input 18 from the oneframe-delayed signal at the output of the one frame delay 20 to yield luminance which has been chroma-style combined in the temporal (time) domain, labeled herein Ypcc (the subscript "p" denoting frame dimension processing).

The temporally combined luminance Ypcc then enters a one line delay circuit 24 wherein it is delayed by a line duration. A second difference circuit 26 subtracts the undelayed temporally combed luminance Ypcc from the one-line-delayed signal to yield a "chroma-style" line combed luminance signal Yhcc, which is itself subtracted from delay matched incoming luminance or video Y in a third difference circuit 28 to produce a "luminance-style", bidimensionally combed luminance signal Yyc on an output lne 30. A delay match circuit 32 appropriately provides phase delay matching, so that the incoming signal Y is in proper phase relationship with the line combed luminance signal Ypcc from the second difference circuit 26.

Figure 5B:
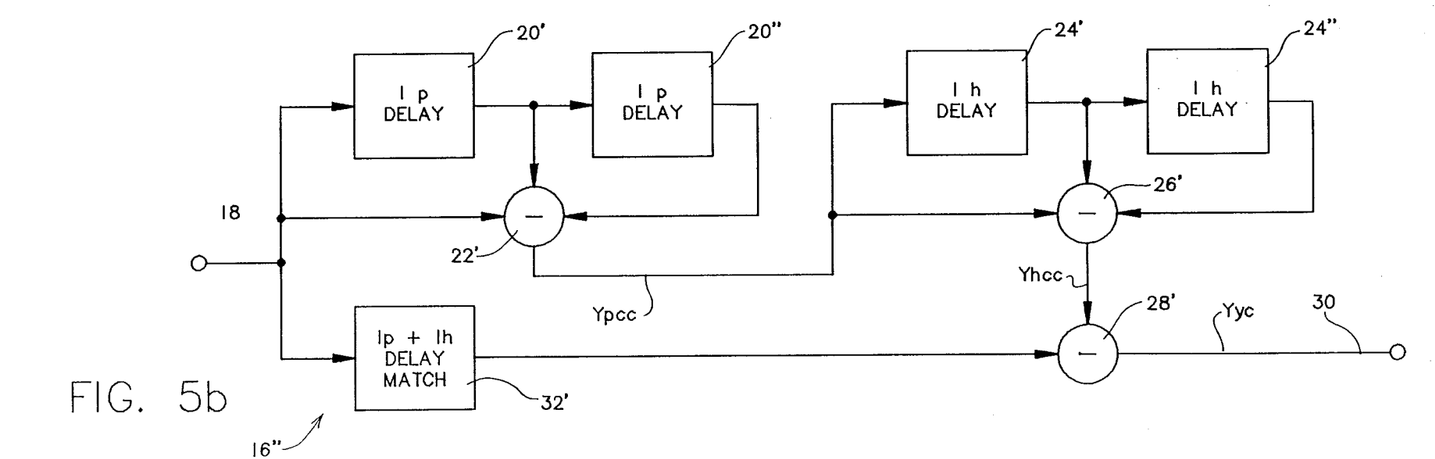
FIG. 5B illustrates a two frame/two line bidimensional comb filter structure which is preferred for use within apparatus of the present invention.

A superior bidimensional comb filter 16″ is depicted in FIG. 5B. Therein, the structural elements are virtually identical to those of the filter 16; however, there are two frame delay circuits 20' and 20" in the frame comb portion, and two line delay circuits 24' and 24" in the line comb portion. Details relating to the bidimensional comb filters 16' and 16" are to be found in co-pending U.S. patent application Ser. No. 06/785,881, filed on Oct. 9, 1985, the disclosure of which is hereby incorporated by reference.

Figure 2:
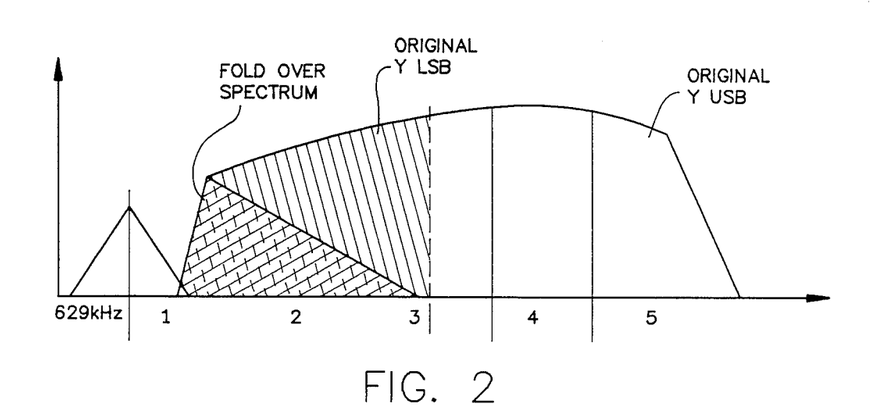
FIG. 2 is a spectral graph similar to that illustrated in FIG. 1, with the exception that aliases of the original luminace upper side band have been folded over into spectral gaps in a mid-band region of the spectrum, in accordance with principles of the present invention.

The comb filter circuit 16 easily separates chrominance by an additive process (as opposed to subtractive process) well understood by those skilled in the art. Comb filter separated chrominance Cc then enters a conventional color-under record processor circuit 34 within the VCR. This color-under circuit 34 generates e.g. a 629 KHz quadrature-modulated carrier signal F carrying the chroma information. This color-under AM signal is then low pass filtered by a suitable filter 36 in order to achieve a color-under average energy spectrum as illustrated within FIG. 1. This low pass filtered signal is then sent to a combiner circuit 38 for addition to the FM carrier modulated by the luminance processed in accordance with the present invention. The result of the combination process is a signal on a line 40 going to the conventional record driver circuit (not shown) and having spectrum as depicted in FIG. 2.

The combed luminance put out by the comb filter 16 on the line 30 enters a fold-over circuit 42 operating at a sub-Nyquist folding frequency Fc, lying in a range between the NTSC color subcarrier frequency Fsc (3.579545 MHz) and 6 MHz. A frequency in the vicinity of 5MHz is preferred. The folding clock frequency Fc is selected with great care to be precisely a harmonic of an odd multiple of the line and frame scan rate of the baseband luminance and also not to create beat patterns with either the color subcarrier or with the color-under AM carrier F (in the VHS format, for example).

Several practical choices for the folding clock frequency for NTSC format are:

$Fc = Fsc - F = 2.950175$ MHz $Fc = Fsc = 455/2Fh$ (and 119,437.5 $Fp$) = 3.579545 MHz
$Fc = Fsc + F = 455/2 Fh + 40Fh = 4.208915$ MHz
$Fc = Fsc + 2F = 455/2 Fh + 80Fh = 4.838285$ MHz
$Fc = Fsc + 3F = 455/2 Fh + 120Fh = 5.467655$ MHz A similar approach is to be followed in selecting appropriate folding frequencies in the PAL format, given the slightly variant color phase reversal nature of that format, as is well understood by those skilled in the art.

Figure 8A:
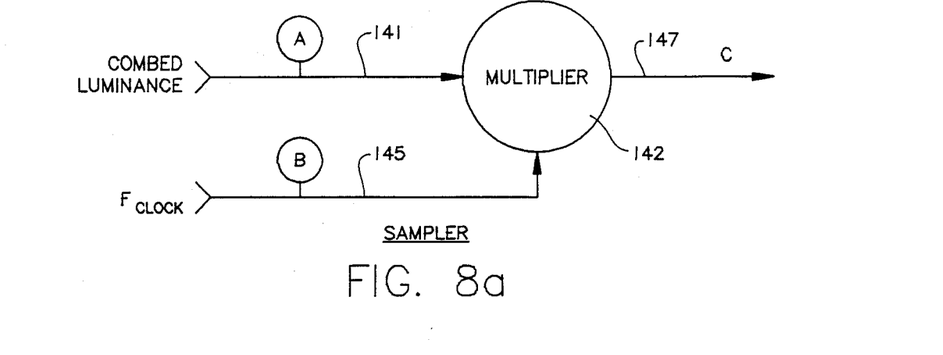
FIGS. 8A and 8B illustrate a sampling circuit providing a preferred form of fold over and unfolding circuit employed in conjunction with the present invention.

The fold over circuit 42 may be implemented in a variety of ways, whether by way of hetrodyne oscillator/mixer, or by way of a sampling circuit as illustrated in FIG. 8 and described hereinafter in greater detail. An Fc generator circuit 43 generates the predetermined folding frequency Fc and supplies it to the fold over circuit 42.

Figures 3, 3C, 3D:
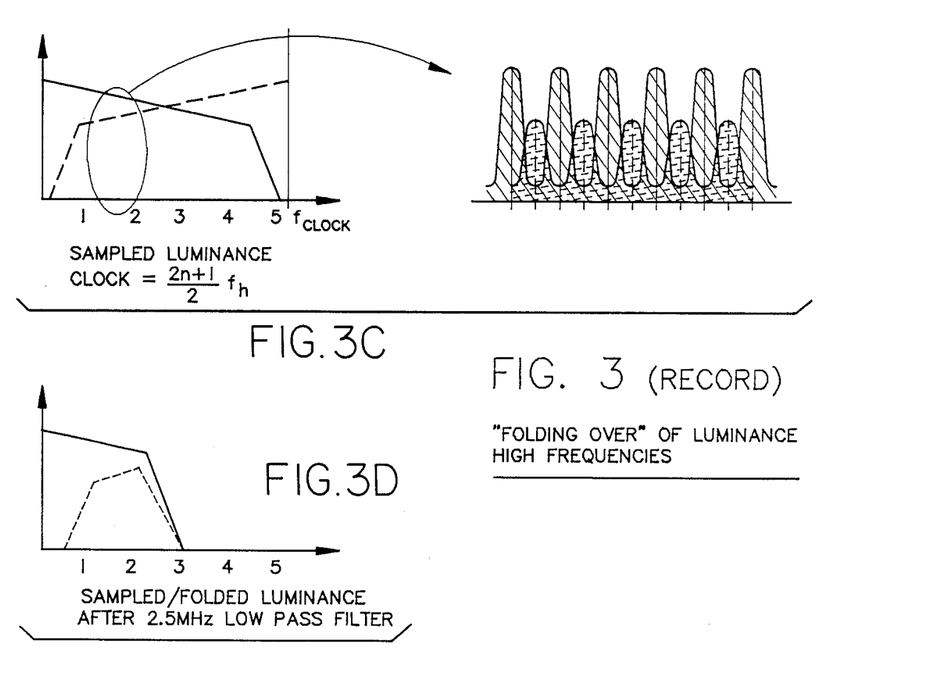
FIG. 3C illustrates in full spectrum and expanded views the insertion of aliases of luminance upper sideband energy groups into the mid-frequency spectral gaps of the composite signal.
FIG. 3D illustrates a bandwidth reduced version of the composite signal including the folded-over aliases of high frequency energy; this figure illustrates the energy distribution actually recorded onto the limited bandwidth record medium.
Figure 3A:
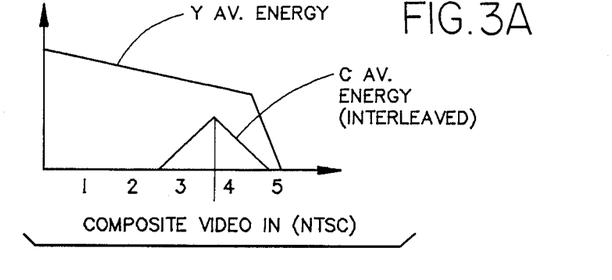
FIG. 3A illustrates the average energy distribution in the frequency domain (spectrum) of an incoming full bandwidth composite NTSC quadrature modulated color subcarrier television signal.
Figure 3B:
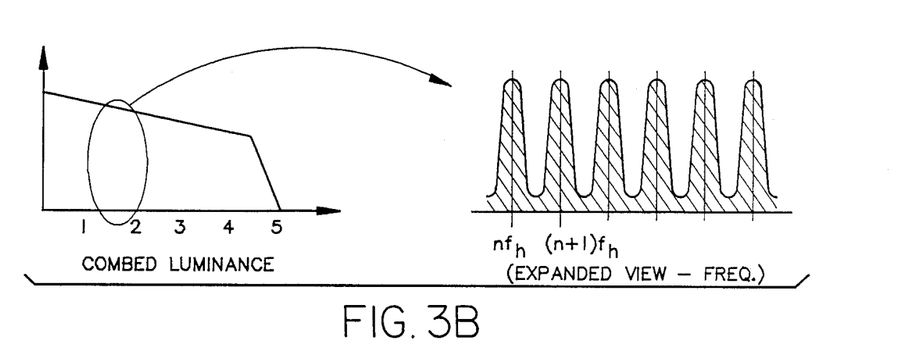
FIG. 3B illustrates in full spectrum and expanded views the elimination of the chroma information and the introduction of spectral gaps in a mid-frequency portion of the composite signal by comb filter processing.

An output line 44 from the fold over circuit 42 carries a signal illustrated by FIG. 3C wherein the spectral regions between energy groups of mid-frequency luminance are filled with aliases of the high frequency luminance which has been folded over into the mid-frequency portion of the spectrum. The output line 44 leads directly to the input of a mid-band low pass filter 46.

The characteristics of the low pass filter 46 should be carefully selected and controlled. Ideally, this filter 46 has a half amplitude point precisely aligned with a frequency corresponding to half of the folding frequency Fc and has symmetrical characteristics on each side of this point. This creates a spectrum, such as that illustrated in FIG. 3D, which will achieve a flat full frequency response during the unfolding process in playback.

Figure 4A:
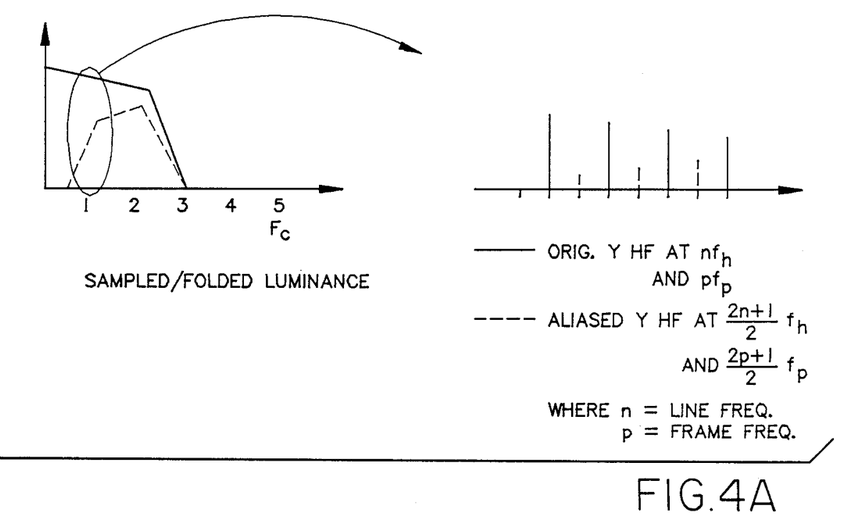
FIG. 4A illustrates in full spectrum and enlarged view the average energy distribution in playback of the limited bandwidth record medium recorded with the FIG. 3D signal.
Figure 4B:
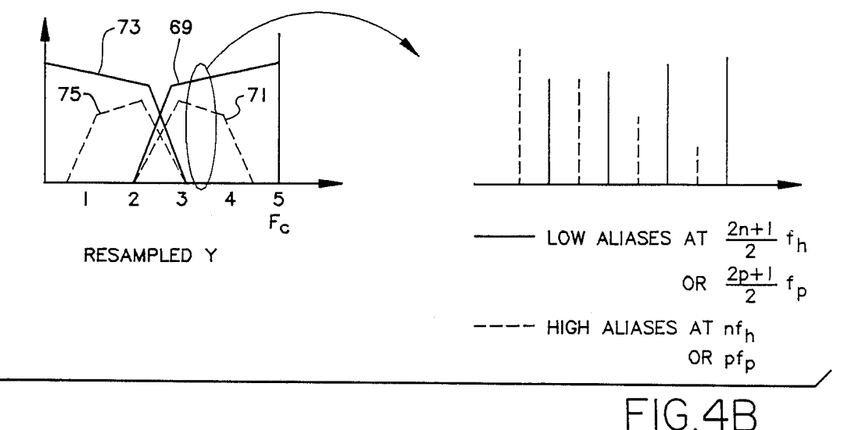
FIG. 4B illustrates the average energy distribution resulting from operation of an unfolding circuit which generates aliases including an alias of the high frequency luminance originally folded into the spectral gaps, and other aliases, to provide an unfolded signal.

During the playback process, an image of the FIG. 3D frequency response will be produced, as shown in FIG. 4B. It is important that the amplitude response of the image at a mirror frequency about the sampling frequency Fc be equal to the amplitude response of the signal put out by the low pass filter 46.

The properly folded and low pass filtered video leaving the filter 46 on a line 48 enters a conventional FM modulator 50 in the VCR which modulates the processed luminance (FIG. 3D) into a spectrum of the type illustrated for luminance in FIG. 1. This spectrum is then combined with the color-under AM spectrum in the combining circuit 38 and recorded on the magnetic tape media.

An RF playback signal (FIG. 4A) enters the playback section 12 on a line 52. On path for the line 52 leads to a low pass filter 54 which low passes the amplitude modulated color carrier F and sidebands in order to remove any luminance information. This filtered signal is converted into to conventional NTSC quadrature modulated color subcarrier format by operation of a conventional color under playback processor 56 within the VCR. The color subcarrier is put out on a line 58 which leads to a combining circuit 60 where it is combined with recovered luminance Yc having its bandwidth extended in accordance with the present invention.

The RF playback signal path 52 also leads to a high pass filter 62, complementary with the low pass filter 54, so that the frequency modulated luminance spectrum is passed, and the color-under spectrum is rejected. The passed spectrum is then demodulated in a conventional FM demodulator circuit 64 within the VCR. Then, the demodulated luminance is unfolded by a luminance unfolding circuit 66 which processes the folded luminance signal spectrum depicted in FIG. 4A into the signal spectrum depicted in FIG. 4B.

The unfolding process is preferably carried out in a manner functionally identical to the operation of the fold over circuit 42 found in the record circuit 10, and in most practical embodiments, the actual circuitry of the circuit 42 is used to perform the functions of the circuit 66, there being switches provided to switch the circuit between record and playback mode within the VCR.

The circuit 66 unfolds (samples) at the same preselected folding frequency Fc selected for the folding operation. However, unlike the record mode wherein the folding clock frequency Fc is generated from a stable frequency reference, the unfolding clock frequency Fc' is phase locked by an Fc' generator circuit 68 to synchronizing information played back from the record medium as part of the video playback and sent to the generator circuit 68 over a line 70. Alternatively, the folded luminance signal entering the circuit 66 may be time base corrected and a stable reference used to provide the unfold clock frequency Fc'.

Figure 4C:
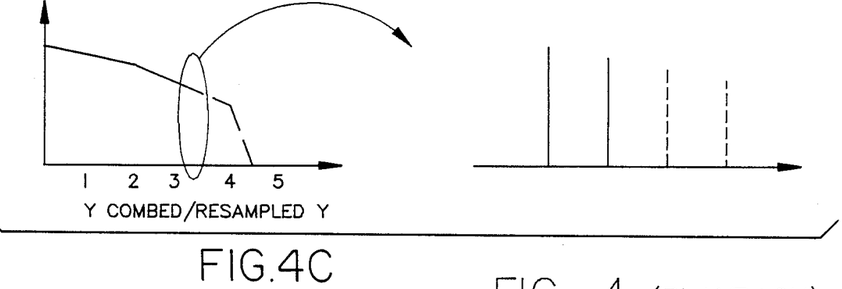
FIG. 4C illustrates the effect of comb filter processing of the unfolded signal wherein phase cancellation of the unwanted aliases yields a likeness of the original video having full bandwidth.

The unfolded and aliased spectrum dipicted in FIG. 4B and put out by the unfolding circuit 66 is then passed through a comb filter 68, preferably having the same implementation as the comb filter 16 in the record circuit 10. The unfolding circuit 66 creates images 69 and 71 of the originally folded spectrum 73 and 75 being played back (see FIG. 4B). By virtue of the phase relationships of the aliases 69, 71 and 75, the aliases 69 and 75 are phase cancelled by the comb filter 68, and the alias 71 is added to the original energy distribution 73 to achieve the energy spectrum distribution illustrated in FIG. 4C. In this manner the alias 71 provides restored high frequency luminance energy groups to the luminance signal in proper frequency and phase relationship, thereby providing a close likeness of the original luminance information. This likeness Yc' is then sent to the combining circuit 60 and combined with played back chrominance to provide a video playback signal on an output line 72.

One important feature of the circuits 10 and 12 is that the same comb filter may be used not only for the luminance/chrominance separation and luminance preprocessing circuit 16 but may also be used for the luminance playback comb filter circuit 68. In like manner, the fold over circuit 42 may be common structure for providing the unfold circuit 66.

Since the unfolding clock frequency signal Fc' is in the preferred embodiment derived from video synchronizing information being played back from the record medium, preferably the folding process in record, and then the unfolding process in subsequent playback, is inhibited during the video blanking interval when the horizontal and vertical synchronizing information is being generated and put out. If time base error corrector (TBEC) processing is carried out in the playback mode, then the unfolding clock frequency signal Fc' may be constant and equal to Fc.

Figure 7A:
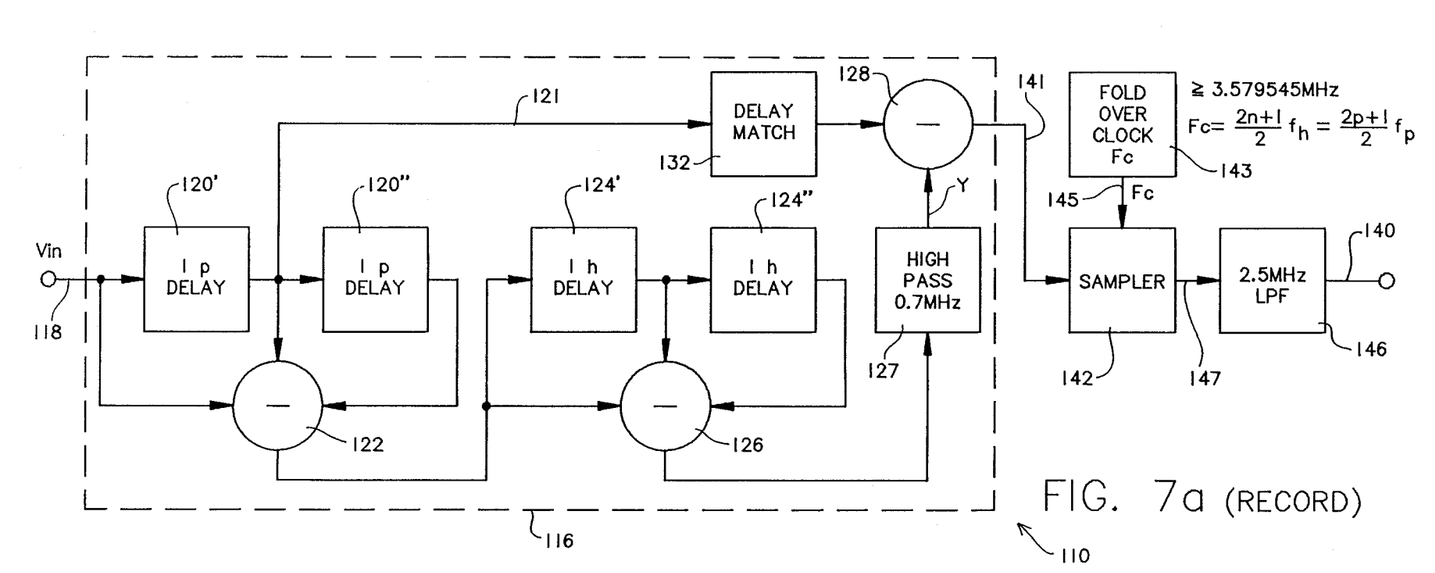
FIG. 7A provides a more detailed illustration of the FIG. 6A embodiment of a limited bandwidth video recording apparatus operating in the record mode in accordance with principles of the present invention.
Figure 7B:
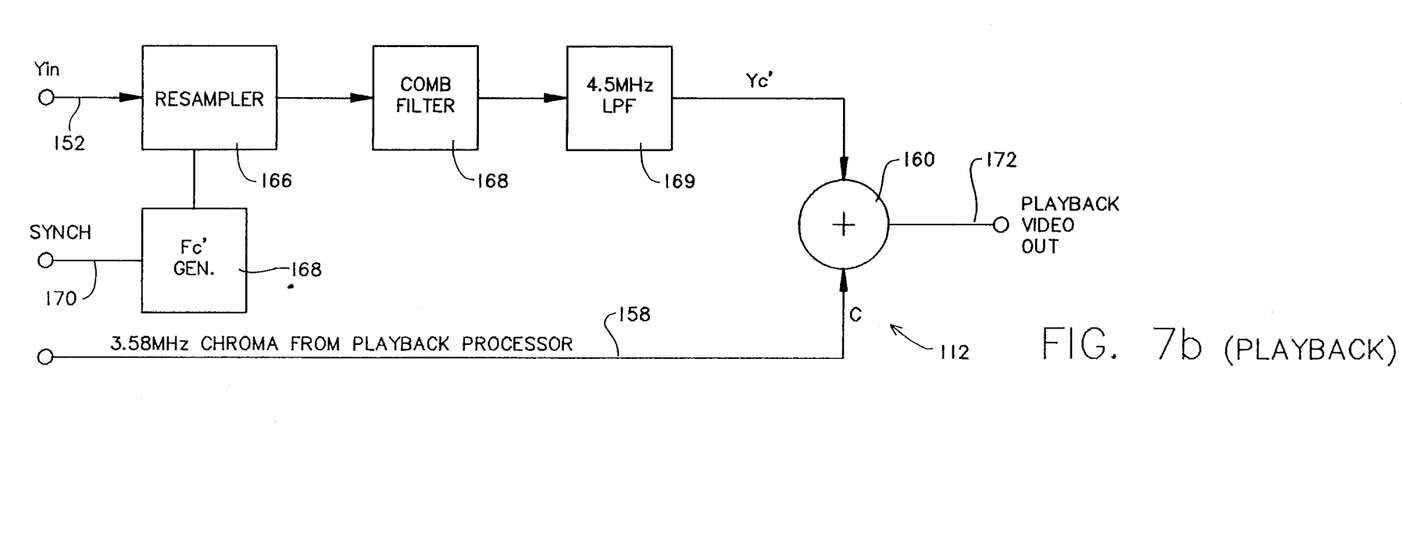
FIG. 7B provides a more detailed illustration of the FIG. 6B preferred embodiment of limited bandwidth video playback apparatus operating in the playback mode in accordance with principles of the present invention.

A more detailed description of the preferred implementation of the present invention is depicted in FIGS. 7A and 7B. In this embodiment elements which are the same or similar to the elements of the FIGS. 6A and 6B embodiment have the same reference numerals offset by +100.

A record circuit 110 of FIG. 7A provides the folding process, and a playback circuit 112 of FIG. 7B provides unfolding process, of the present invention. In the environment of a VCR, both of the circuits 110 and 12 are typically included within the machine, with substantial amounts of shared circuitry. This embodiment makes practical use of digital circuitry, particularly for the multiple one frame stores 120' an 120".

The comb filter 116 is of the chrominance comb variety in which a temporally and spatially combed difference signal passed through a high pass filter 127 having a 0.7 MHz lower cutoff frequency is subtracted from a main path (one frame period delayed) signal on a line 121 in a difference circuit 128. This circuit provides combed luminance at its output.

The combed luminance output from the difference circuit is input to a sampler circuit 142 which samples the combed luminance spectrum at a folding clock frequency Fc generated by a fold over clock generator 143. As with the prior embodiment, the clock frequency is very carefully selected to minimize undesirable hetrodyne interference and to enable recovery of the desired alias (and simultaneous rejection of the unwanted aliases) by comb filter processing in the playback path.

As is apparent by FIG. 7A, in this preferred embodiment 110, the fold over circuit is implemented specifically as a sampling circuit. One form of sampling circuit is illustrated in, and discussed in connection with, FIG. 8.

The luminance having folded over high frequencies is then passed through a low pass filter 146 having the same characteristics and symmetry requirements previously discussed in connection with the low pass filter 146.

Bandwidth limited luminance having folded over high frequencies interleaved in spectral gaps in its mid-frequency range is put out by the record processing circuitry 110 on a line 140. The signal on this line then enters a record driver and ultimately is recorded on the record medium or passed through some other limited bandwidth medium or transmission path.

In playback or recovery, the circuit 112 includes an input line 152 which receives the incoming signal from e.g. the tape storage medium. A presampler 166, preferably having the same structure and functional characteristics as the sampling circuit 142 unfolds the folded over luminance by a second sampling operation, operating at a clock frequency Fc' generated by a generator 168, phase locked to playback sync coming in on a line 170. The result is a signal having an average energy distribution as graphed in FIG. 4B.

A comb filter 168, preferably identical to, or the same structural as, the comb filter 116, comb filters the unfolded luminance and thereby cancels unwanted alias components 69 and 75 of FIG. 4B, and causes the selected alias 71 to be combined with the original midband luminance to achieve a restored bandwidth combed luminance signal Yc' closely resembling the original full bandwidth luminance Y.

It is to be understood that the comb filter is to be composed at all times of delay elements exactly equal to the frame or line periods of the incoming playback video signal. Therefore, if the luminance is not time-based corrected, clock frequencies and phases used to devlop delay modules within the comb filter have to be locked to incoming sync, instead of being constant as is the case in the record mode.

The combed full bandwidth luminance Yc' is then added to chrominance in the combiner circuit 160 and put out on an output line 172.

As already mentioned, the folding and unfolding circuits may employ a variety of techniques in order to generate the desired alias spectrum depicted in FIG. 3C in record or transmit mode, and in FIG. 4B in playback or receive mode. One preferred form for the folding and unfolding circuitry is depicted generally as the multiplier 142 in FIG. 8A, and more specifically as the multiplier circuitry in FIG. 8B. Its operation is explained in conjunction with FIG. 9.

Figure 9:
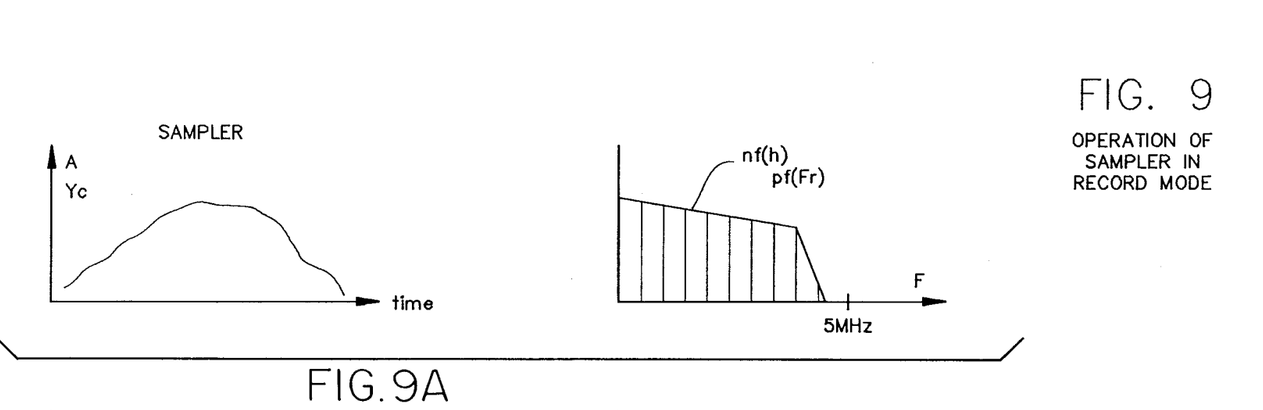
FIGS. 9A, 9B, and 9C illustrate in the temporal and spectral domains the operation of the sampling circuit depicted in FIG. 8A and 8B.
Figure 9B:
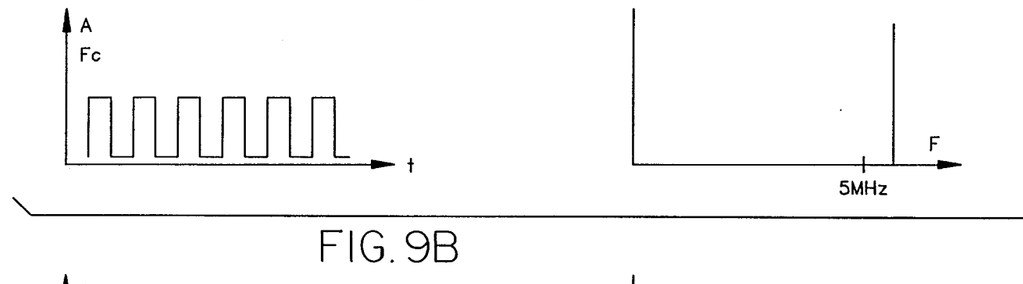
Figure 9C:
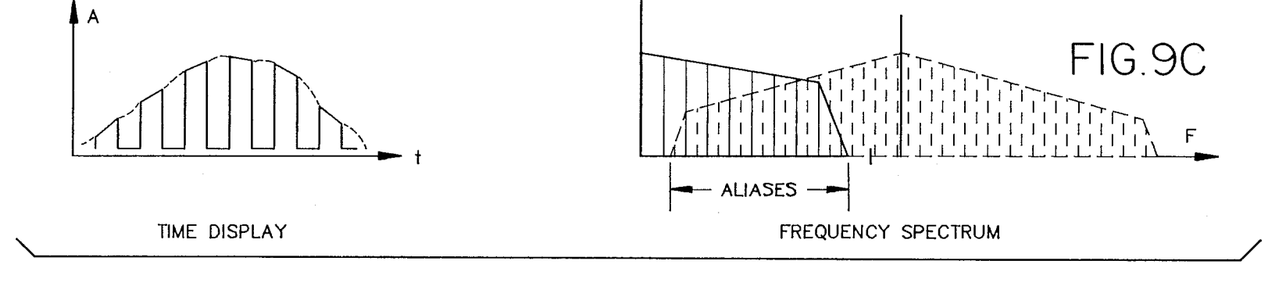

Combed luminance Yc enters the multiplier on a line 141. It has a time base graph depicted as the left graph of FIG. 9A, and a spectrum distribution depicted as the right graph of FIG. 9a. The folding clock frequency Fc enters the multiplier 142 on a line 145 from the folding clock frequency generator 143. The folding clock frequency Fc is depicted in the time domain in the left graph of FIG. 9B and in the frequency spectrum domain in the right graph of FIG. 9B. The output, being a sample spectrum of the input, is provided on a line 147, and it is depicted in the time domain by the left graph of FIG. 9C and in the frequency spectrum domain in the right graph of FIG. 9C which is similar to the information graphed in FIG. 3C.

Figure 8B:
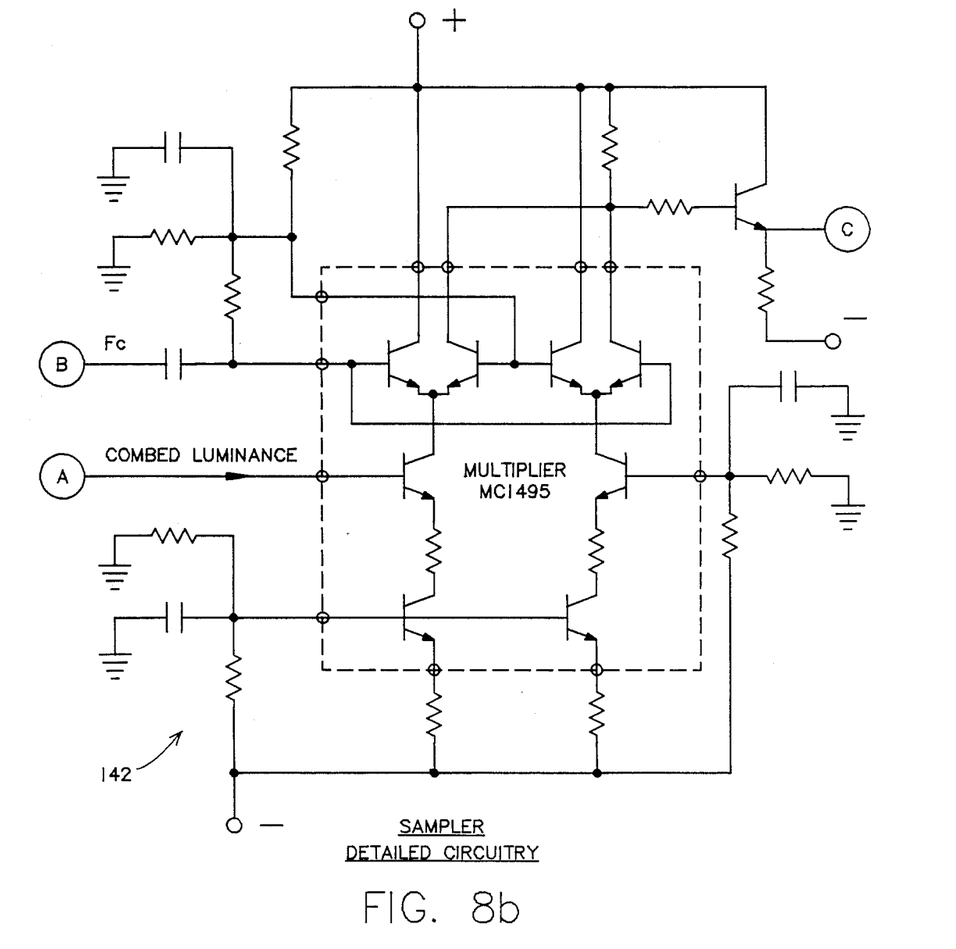

FIG. 8B depicts structural detail of the sampling circuit. In practice a four-quadrant multiplier chip, such as a Motorola type MC 1495 or 1496 works well in the preferred implementation of the sampling circuit.

In practice some comb filter adaptivity is desirable, particularly to cover situations when there are diagonal transitions and in the event of motion. In the case of diagonal transitions, high pass filtering may be substituted for the line comb structure as the eye is not sensitive to diagonal transition resolution, and in the case of motion, the frame comb structure may be selectively bypassed, as the eye is less sensitive to motion than to stataionary images.

To summarize, the presently preferred embodiment within the environment of a "VHS" video recording and playback system involves the following operations:

1. Precombing video input by bidimensional comb filtering of the FIG. 5B variety. The comb clock frequency is preferably 4Fsc=14.3 MHz=910 Fh.

2. Chroma color-under processing by conventional methods to obtain a 629 KHz=40 Fh color under signal.

3. Luminance sub-Nyquist sampling via a type MC 1495 four-quadrant multipler at a sample frequency of
$Fc = 455/2 Fh + 40 Fh = 4.208545$ MHz 4. FM modulation between 3.4 MHz (sync) and 4.7 MHz (peak white).

5. Addition of chroma at 629 KHz, recording and playback.

6. Chroma playback processing by conventional methods.

7. Luminance demodulation—At the output of the demodulator, the frequency response of the signal is precisely −6db at 2.1 MHz and symmetrical (on a linear scale) throughout the roll-off region between 1.8 and 2.4 MHz.

8. Luminance sub-Nyquist sampling by $Fc' = 535/2\ Fh;$

Fc' being locked to the play-back sync.

9. Luminance post-combing by a bi-dimensional comb filter of the FIG. 5B variety with a comb clock locked in frequency and phase to the playback sync and defined by $F = 910\ Fh'$ 10. Addition of the 3.58 MHz chrominance.

While the present invention has been illustrated primarily in conjunction with improving the performance of low cost VCR's operating in accordance with the NTSC or PAL color formats, for example; it is to be understood that the present invention applies effectively to any situation in which video information having a certain nominal bandwidth is to be passed through a medium having a bandwidth substantially less than the nominal bandwidth of the input signal.

The present invention is equally applicable to video recorers in which luminance and chrominance information signals are recorded on separate tracks, sometimes on a time-compressed form. The luminance bandwidth of these recorders, such as the Betacam or M format, is typically low and is significantly improved by the present ivention. While the VHS magnetic tape format is illustrated by way of an exemplary operating environment, it will be appreciated that the principles of the present invention apply with equal results to other tape-based formats, including the 8 millimeter format.

It will be understood by those skilled in the art that it is equally practical to carry out a similar sub-Nyquist fold over process upon chrominance information in order to improve chrominance bandwidth.

Also, while the presently contemplated limited bandwidth record medium is magnetic tape, the principles of the present invention also apply to other types of storage media, including laser-read disks.

Having thus described a presently preferred embodiment of the present invention, it will now be appreciated that the objects of the invention have been fully achieved, and it will be understood by those skilled in the art that many changes in construction and widely varying embodiments, techniques and applications of the invention will suggest themselves without departure from the spirit and scope of the present invention. The disclosures and the description herein are therefore purely illustrative and are not intended to be in any sense limiting.

I claim:

1. Apparatus for processing incoming scanning lines of video information having a nominal bandwidth for use with a bandwidth degrading path the apparatus including a preprocessor before the path and a postprocessor following the path, the preprocessor including preprocessor comb filter means for comb filter processing of the incoming scanning lines to assure the presence of spectral gaps between energy groups in the spectrum of the video information, fold over means for folding over high frequency luminance components of the video information into said spectral gaps with a predetermined folding frequency to provide folded video, low pass filter means for low pass filtering the resultant folded video to limit the spectrum thereof to be not greatly in excess of one half of the said folding frequency;

the postprocessor following the limited bandwidth path including unfolding means for unfolding the signal folded video from the path about the predetermined folding frequency, postprocessor comb filter means for comb filter processing the unfolded signal to eliminate unwanted alias components therein resulting from the unfolding process to provide a resultant video signal closely approximating the bandwidth and content of the original video information.

2. The apparatus set forth in claim 1 wherein the bandwidth degrading path comprises a magnetic storage medium.

3. The apparatus set forth in claim 1 contained in a video cassette recorder and wherein the magnetic storage medium comprises magnetic tape contained in a cassette.

4. The apparatus set forth in claim 3 wherein circuitry for implementing the preprocessor comb filter means is substantially the same circuitry for implementing the postprocessor comb filter means.

5. The apparatus set forth in claim 3 wherein circuitry for implementing the fold over means is substantially the same circuitry for implementing the unfolding means.

6. The apparatus set forth in claim 1 wherein the predetermined folding frequency is an odd multiple of one half of the frequency of the scanning line.

7. The apparatus set forth in claim 6 wherein the incoming scanning lines video information are in accordance with the NTSC color television format, and the folding frequency is selected from a group including 2.950175 MHz, 3.579545 MHz, 4.208915 MHz, 4.838285 MHz and 5.467655 MHz.

8. The apparatus set forth in claim 1 wherein the predetermined folding frequency lies in a range between 3 and 6 MHz.

9. The apparatus set forth in claim 1 wherein the unfolding mean is operated by a folding frequency phase locked to synchronizing information obtained from the signal passing through the limited bandwidth path.

10. The apparatus set forth in claim 1 wherein the operation of the fold over means in the processor is inhibited during video blanking intervals.

11. The apparatus set forth in claim 3 wherein the incoming scanning lines of video information includes quadrature modulated color subcarrier information, and wherein the video cassette recorder translates the color subcarrier information to amplitude modulate a carrier frequency located below a frequency modulated luminance spectrum.

12. The apparatus set forth in claim 11 wherein the preprocessor comb filter means functions for separating luminance components and chrominance components as well as for assuring the presence of spectral gaps between energy groups in a luminance spectrum of the video information.

13. The apparatus set forth in claim 11 wherein the preprocessor comb filter means functions adaptively depending upon the content of the incoming video information in order to reduce unwanted artifacts otherwise created in the combed incoming scanning lines.

14. The apparatus set forth in claim 1 wherein the preprocessor comb filter means includes structure for processing in the temporal and spatial domains of the video information.

15. The apparatus set forth in claim 1 wherein the postprocessor comb filter means includes structure for processing in the temporal and spatial domains of the signal.

16. The apparatus set forth in claim 1 wherein the bandwidth degrading path comprises magnetic tape and wherein chrominance information and luminance information are recorded on separate tracks formed on said tape.

17. The apparatus set forth in claim 1 wherein the scanning lines of video information comprises chrominance.

18. Color video recording apparatus including a video recorder device having a record processing means for recording video information on a record medium, an input signal processing circuit comprising comb filter means for preprocessing the video information to establish and promote spectral gaps in a mid-frequency region of the video luminance signal, fold over means coupled to the comb filter means and operating at a predetermined fixed folding frequency selected to generate aliases of high frequency luminance information at frequencies approximately equal to those of said spectral gaps, low pass filter means coupled to the fold over means for low pass filtering the luminance signal through the mid-frequency region thereof, said low pass filter means being connected to the record processing means for recording on the record medium a bandwidth limited portion of the video information including the folded over aliases of high frequency luminance.

19. Color video playback apparatus for playing back preprocessed video information stored on a record medium including a playback signal processing circuit for playing back the preprocessed video information from the record medium wherein aliases of high frequency luminance of original full bandwidth video information have been folded over into spectral gaps lying between energy groups located in a mid-band region of luminance about a predetermined folding frequency, the apparatus including an unfolding means operating in response to an unfolding frequency signal for generating aliases from the preprocessed video information being played back, and comb filter means connected to the unfolding means for comb filter processing of the unfolded signal to phase cancel unwanted aliases and put out a reproduction of the original full bandwidth video information.

20. Color video playback apparatus set forth in claim 19 further including time base error corrector means for correcting time base errors otherwise present in the played back preprocessed video information.

21. A record medium containing stored information representing scanning lines of preprocessed video wherein the medium has been configured by a method comprising the steps of:
  comb filter preprocessing of original full bandwidth video information to establish and promote spectral gaps in a mid-frequency region of the video luminance signal to provide a combed luminance signal,
  folding over high frequency components of the combined luminance signal about a predetermined fold over clock frequency into mid-frequency spectral gaps promoted by the step of comb filter preprocessing of the original full bandwidth video information to generate folded bandwidth luminance signal,
  low pass filtering the folded bandwidth luminance signal so that a resultant filtered/folded bandwidth luminance signal is contained in a spectrum not substantially greater than one half the predetermined fold over clock frequency, and
  recording the resultant filtered/folded bandwidth luminance signal onto said record medium.

22. Apparatus for processing incoming scanning lines of quadrature modulated color subcarrier television within a video recording and playback machine, the apparatus including a preprocessor in a record path within the machine and a postprocessor within the playback path within the machine,
  the preprocessor including preprocessor bidimensional comb filter means for comb filter processing in the temporal and spatial domains the incoming scanning lines simultaneously for separating chrominance and luminance components and for assuring the presence of spectral gaps between energy groups in the spectrum of the combed luminance component, fold over means for folding over a high frequency luminance spectral region about a predetermined folding frequency in order to insert aliases of the high frequency spectral region into said spectral gaps in a mid-frequency region of said luminance component to create a folded spectrum, low pass filter means for low pass filtering said folded spectrum to limit it to a predetermined bandwidth not substantially greater than one half the predetermined folding frequency, chroma color-under processing means for creating a chroma carrier modulated with the comb filter separated chrominance component at a predetermined low frequency, frequency modulator means for modulating the low pass filtered folded spectrum upon a luminance carrier located above the chroma carrier, and preprocessor combining means for combining said chroma carrier and said luminance carrier into a composite signal for recording onto a storage medium used in conjunction with said video recording and playback machine;

the postprocessor including spectrum splitting means for separating said chroma carrier and said luminance carrier, FM demodulator means for demodulating said luminance carrier, color-under playback processing means for recovering said quadrature modulated chrominance component from said chroma carrier, unfolding means connected to the FM demodulator means for unfolding the folded spectrum luminance component to create a plurality of aliases, postprocessor bidimensional comb filter means for comb filter processing in the temporal and spatial domains the unfolded luminance component to eliminate unwanted aliases in order to recover the original full bandwidth luminance component, and postprocessor combining means for combining the recovered quadrature modulated chrominance component and the recovered luminance component into a playback television signal.

23. The apparatus set forth in claim 22 adapted for operating in accordance with the NTSC color television format.

24. The apparatus set forth in claim 22 adapted for operating in accordance with the PAL color television format.

25. The apparatus set forth in claim 22 wherein the video recording and playback machine operates in conjunction with magnetic tape contained in a cassette and is adapted for operating in accordance with the VHS format.

* * * * *